Patented Nov. 2, 1943

2,333,500

UNITED STATES PATENT OFFICE 2,333,500

CATALYTIC REACTION

Albert B. Welty, Jr., Mountainside, N. J., assignor, by mesne assignments, to Standard Catalytic Company, a corporation of Delaware No Drawing. Application December 31, 1940, Serial No. 372,492

5 Claims. (Cl. 196—53)

This invention relates to catalytic reactions conducted in the presence of hydrogen and is more particularly concerned with an improved method of bringing the catalyst up to reaction temperature prior to contact with the reactants.

Illustrative of the type of catalytic reactions conducted in the presence of hydrogen with which the invention is concerned are catalytic reforming in the presence of hydrogen, catalytic cracking in the presence of hydrogen, catalytic dehydrogenation in the presence of hydrogen and catalytic aromatization in the presence of hydrogen.

These processes are characterized by the fact that the catalysts gradually lose their activity for promoting the desired reaction because of the deposition or formation thereon of carbonaceous contaminants such as coke. Removal of the coke, by combustion, for example, will restore the activity to a great extent. Because of this gradual loss of activity of the catalysts, periodic regeneration treatments are necessary and hence the entire process is cyclic in nature, that is, a period of reaction is followed by a period of regeneration.

The most convenient method of regeneration is to burn off the coke which has been deposited on the catalyst during the reaction portion of a cycle. This is effected by passing hot, inert gases containing regulated, small amounts of air or oxygen through the catalyst mass until substantially all of the carbonaceous matter has been burned. The temperature at which the gases are contacted with the catalyst must be high enough to initiate combustion of the carbon but must not be so high that maximum temperatures above 1200 to 1400° F. are developed because temperatures above these limits are found to impair permanently the activity of most of the catalysts used in these reactions. The space velocity of the inert gas mixture through the catalyst mass must also be adjusted vis-vis the temperature and the oxygen content of the gas so that the heat developed by the combustion of the carbon will be absorbed.

Catalysts capable of being regenerated in the manner just described and which are especially useful in catalytic reactions conducted in the presence of hydrogen consist of a minor amount of an oxide of a metal of the II, III, V, VI and VIII groups of the periodic system and a major amount of an active base or carrier comprising materials of the nature of alumina, activated alumina, silica gel, silica-alumina, silica-magnesia, aluminum silicate, acid treated bentonites and montmorillonites, "Super-Filtrol," bauxite, alumina gels, peptized alumina gels, peptized aluminum hydrates and other aluminous or siliceous materials. The base material may first be treated with hydrofluoric acid, fluosilicic acid or other fluorine compounds.

Particularly active catalysts consist of from 1 to 50% by weight of an oxide or sulfide of molybdenum, chromium or tungsten and the remainder activated alumina or peptized aluminum hydrate.

In conducting these catalytic reactions in the presence of hydrogen, it will be understood that the catalyst, either fresh or freshly regenerated, must be brought up to the required reaction temperature before the hydrocarbons to be treated are allowed to come in contact with it. Heretofore it has always been considered desirable, primarily from a safety standpoint, not to allow the hydrogen to come in contact with the catalyst until it was at the required reaction temperature. This was particularly true in the case of a freshly regenerated catalyst in order to avoid mixing of traces of oxygen from the regeneration gases with the hydrogen.

The method of bringing the catalyst to reaction temperature heretofore employed consisted in circulating an inert gas such as nitrogen or flue gas through the catalyst mass at a gradually increasing inlet temperature until finally the inlet temperature had been raised to the desired reaction temperature. For example, with a fresh catalyst, if the desired reaction temperature were 950° F., nitrogen would be circulated through the catalyst mass and the inlet temperature would be increased at the rate of say 50° F. per hour until it had reached 500° F. and thereafter the inlet temperature would be increased at the rate of 30° F. per hour until it had reached 950° F. When this point was reached, the circulation of nitrogen was stopped and hydrogen was introduced and the pressure allowed to build up to that desired for the reaction. If the catalyst had just been freshly regenerated, it would already be at a high temperature and of course it would only be necessary to raise it from that point to the temperature desired for reaction. The same general procedure would be used, however, i. e. the circulation of hot nitrogen or other inert gas at gradually increasing inlet temperatures.

I have found that with catalysts containing compounds of metals of the VI group of the periodic system, and particularly with those containing chromium compounds, the sudden introduction of hydrogen into the catalyst mass after it has been brought to a high temperature causes an exothermic reaction which proceeds at such a rapid rate that the temperature frequently rises well above 1400° F. within one or two minutes. Control of temperature under these circumstances is impossible because of the rapid rate of the exothermic reaction between the hot catalyst and the hydrogen. Temperatures around 1400° F. have a highly injurious effect on the activity of the catalyst as is indicated by the fact that when the temperature is brought down again to about 900–1000° F., the results obtained with the catalyst are much inferior to those obtained with the same type of catalyst which has not been allowed to reach a temperature of 1400° F. or more.

The present invention provides a method for avoiding this sudden increase in the temperature of these catalysts during the warming up period. The nature of this method will be fully understood from the following description:

The fresh or freshly regenerated catalyst is brought up to the desired reaction temperature by circulating a mixture of hydrogen and an inert gas, the inlet temperature of which is gradually increased. When the desired temperature is reached, hydrogen or a gas rich in free hydrogen is introduced and circulated. The proportion of hydrogen in the mixed gases circulated may be regulated so that the exothermic heat of reaction between the catalyst and hydrogen is at no time sufficient to allow the temperature in the catalyst mass to get above about 1000–1100° F. By bringing the catalyst up to temperature in this manner, the exothermic reaction between the catalyst and hydrogen occurs at a lower temperature so that the rate of reaction is much slower and can be more readily controlled than if it started at the higher temperatures. Furthermore, by allowing the exothermic reaction to start at a lower temperature the catalyst temperature can be allowed to increase without detrimental effect.

It will be understood that the quantity of mixed gas circulated and the proportion of hydrogen therein are regulated in relation to each other and in relation to the temperature at which the catalyst is at a particular point so that the maximum temperature developed will at no time exceed 1000–1100° F. or whatever other temperature is found to be injurious to the catalyst. The exact quantities of gas and proportions of hydrogen will depend very largely on the particular catalyst and the temperature to which it is to be heated. By way of example only, it may be said that the quantity of gas circulated may be from 100 to 1000 volumes per volume of catalyst per hour and the proportion of hydrogen may be from 10 to 30%. The length of time required to raise the catalyst to the desired temperature may vary over wide limits, say from ½ to about 5 hours or more.

After the catalyst has been brought to the desired temperature, the inert gas is gradually cut out until hydrogen or a gas containing between 40 and 70% of free hydrogen is circulated.

This invention is not limited by any theories of the mechanism of the reactions nor by any details which have been given merely for purposes of illustration but is limited only in and by the following claims in which it is intended to claim all novelty inherent in the invention.

I claim:

1. In a process for carrying out a catalytic reaction in the presence of hydrogen, the method of preventing the injurious superheating of a hot regenerated catalyst having the property of exhibiting a substantial rise in temperature on contact with hydrogen which comprises circulating an inert gas initially containing a small proportion of hydrogen thru said hot regenerated catalyst mass, gradually increasing the proportion of hydrogen in the gas being circulated until the catalyst has become inured to the presence of high concentrations of hydrogen so that the final temperature of the catalyst is not over 1000°–1100° F.

2. In a process for carrying out a catalytic reaction in the presence of hydrogen, the method of preventing the injurious superheating of a hot regenerated catalyst having the property of exhibiting a substantial rise in temperature on contact with hydrogen which comprises circulating a mixture of an inert gas initially containing 10–30% hydrogen thru said hot regenerated catalyst, gradually increasing the proportion of hydrogen in the gas being circulated until the gas contains 40–70% hydrogen while controlling the temperature of the catalyst so that its final temperature is approximately the desired reaction temperature and is not over 1000°–1100° F.

3. Process according to claim 2 wherein the catalyst comprises a minor amount of an oxide of a metal of the VI group of the periodic system and a major amount of aluminum oxide.

4. Process according to claim 2 in which the catalyst comprises a minor amount of a chromium compound and a major amount of a substance selected from the class consisting of alumina, silica, alumina-silica, acid-treated bentonites, and acid-treated montmorillonites.

5. Process according to claim 2 in which the catalyst comprises a minor proportion of a chromium compound and a major proportion of aluminum oxide.

ALBERT B. WELTY, Jr.